United States Patent [19]
Hiroi

[11] Patent Number: 5,245,529
[45] Date of Patent: Sep. 14, 1993

[54] TWO DEGREES OF FREEDOM TYPE CONTROL SYSTEM

[75] Inventor: Kazuo Hiroi, Tokyo, Japan
[73] Assignee: Kabushiki Kaisha Toshiba, Kawasaki, Japan
[21] Appl. No.: 757,011
[22] Filed: Sep. 9, 1991

[30] Foreign Application Priority Data

Sep. 7, 1990 [JP] Japan .................................. 2-237642
Sep. 7, 1990 [JP] Japan .................................. 2-237643

[51] Int. Cl.$^5$ ...................... G05B 13/02; G05B 11/42
[52] U.S. Cl. .................................... 364/161; 364/157;
364/158; 364/176; 318/561; 318/609; 395/61;
395/900; 395/903
[58] Field of Search ............... 364/148, 160, 161, 162,
364/163, 176, 177, 183, 157, 158, 159; 318/561,
609, 610; 395/61, 900, 903

[56] References Cited

U.S. PATENT DOCUMENTS

| | | | |
|---|---|---|---|
| 4,539,633 | 9/1985 | Shigemasa et al. | 364/162 |
| 4,641,235 | 2/1987 | Shigemasa et al. | 364/162 X |
| 4,881,160 | 11/1989 | Sakai et al. | 364/161 |
| 5,043,862 | 8/1991 | Takahashi et al. | 364/162 |
| 5,059,880 | 10/1991 | Hiroi | 364/161 |

FOREIGN PATENT DOCUMENTS

0192245 3/1989 European Pat. Off. .
0333477 3/1989 European Pat. Off. .

OTHER PUBLICATIONS

Patent Abstracts of Japan, vol. 11, No. 261 (P-609) [2708], Aug. 25, 1987 & JP-A-62 66 301 (Yamatake Homeywell Co. Ltd., Mar. 25, 1987.
Patent Abstracts of Japan, vol. 12, No. 259 (P-733 [3106]& JP-A-63 46 503 (Yokogawa Electric Corp.) Feb. 27, 1988.

*Primary Examiner*—Joseph Ruggiero
*Attorney, Agent, or Firm*—Oblon, Spivak, McClelland, Maier & Neustadt

[57] ABSTRACT

A system for controlling a process system subject to an external disturbance by adjusting a process variable output by the process system to a given target variable. The system includes a target variable filter unit for generating a computed target variable to perform a compensation control operation, a deviation operating unit for computing a deviation between the process variable and the computed target variable, a main control unit for performing at least proportional and integral control operations on the computed deviation between the process variable and the computed target variable to suppress fluctuation of the process variable produced by the external disturbance, and a target variable control unit for changing an input into the deviation operation unit from the computed target variable to the given target variable only when the deviation between the given target variable and the computed target variable computed by the target variable filter unit is less than a predetermined value.

15 Claims, 6 Drawing Sheets

TWO DEGREES OF FREEDOM TYPE CONTROL SYSTEM

BACKGROUND OF THE INVENTION

This invention relates a process control system, and more particularly to a two degrees of freedom type control system.

A conventional 2 degrees of freedom type control system having a target value filter is constructed as shown in FIG. 1. That is to say, this control system introduces the target variable SV to target variable filter unit 21, and obtains arithmetic target variable SVo by executing arithmetic processing which imparts 2 degrees of freedom to the proportional gain. Then, it introduces this arithmetic target variable SVo and process variable PV from process system 22 to deviation operation unit 23 and obtains deviation E through the (SVo−PV) operation. Next, deviation E obtained by deviation operation unit 23 is introduced into PI control unit 24 which has a transfer function of Kp $\{1-1/(T_I \cdot S)\}$. Here, manipulating variable MV is obtained by executing PI control operation. Then, the construction is such that, after the addition of manipulating variable MV and disturbance D by adder unit 25, control is executed to make arithmetic target variable SVo=control variable PV by impressing this addition result on process system 22. In the above equation, Kp is the proportional gain, $T_I$ is the integral time, and S is the Leplace operator.

Also, target variable filter unit 21 includes coefficient unit $1_1$, subtractor unit $1_2$, first order lag element $1_3$, and adder unit $1_4$.

Coefficient unit $1_1$ multiplies target variable SV introduced from outside by the coefficient $\alpha$ which imparts 2 degrees of freedom to the proportional gain. Subtractor unit $1_2$ subtracts the output of coefficient unit $1_1$, from target variable SV. First order lag element $1_3$ outputs by executing a first order lag operation to make the integral time for the output of subtractor unit $1_2$ a time constant. Adder unit $1_4$ obtains arithmetic target variable SVo by adding the output of first order lag element $1_3$ and the output of coefficient unit $1_1$.

Therefore, in the case of the above construction, the PV→SV transfer function $C_{PM}(S)$ and the SV→MV transfer function $C_{SM}(S)$ become respectively $$C_{PM}(S) = -MV/PV = Kp(1 + 1/T_I \cdot S) \quad (1)$$

$$C_{SM}(S) = -MV/SV = Kp(\alpha + 1/T_I \cdot S) \quad (2)$$

$\alpha$ is the coefficient which imparts 2 degrees of freedom to the proportional gain (a constant capable of being set between 0 and 1). Therefore, 2 degrees of freedom can be achieved if the coefficient $\alpha$ which imparts 2 degrees of freedom to the proportional gain is determined so that the target variable follow-up characteristic becomes optimum after Kp and $T_I$ have been determined so that the disturbance suppression characteristic becomes optimum.

The above target variable filter type control system with 2 degrees of freedom has excellent characteristics which simultaneously optimise the disturbance suppression characteristic and the target variable follow-up characteristic. However, there is the problem of requiring a long time for the settling of target variable SV.

When studying the cause of this, there is at least a first order lag element in target variable filter unit 21. When a target variable SV is changed to a stepped state, the target variable SV of this step change is subjected to the influence of the first order lag element. Therefore, it takes some time until the final value is reached.

Moreover, the influence of first order lag is explained using the response characteristic in FIG. 2. That is to say, FIG. 2 shows the state when target variable SV in the system in FIG. 1 is caused to vary in step form. Only the output, (SV·$\alpha$) of coefficient unit 1, varies in step form. However, the output, {SV·(1−$\alpha$)}, of subtractor unit $1_2$ undergoes the influence of first order lag element $1_3$ and gradually rises to approach target variable SV.

Thus, taking SV=X and SVo=Y, when target variable filter unit 21 shown in FIG. 1 is expressed as a digital arithmetic expression, it becomes $$Y = X + (1-\alpha) \cdot \frac{X}{1 + T_I \cdot S} \quad (3)$$

If Equation (3) is expressed as a differential equation, it becomes $$y + T_I \frac{dy}{dt} = \alpha x + \alpha T_I \frac{dx}{dt} + (1-\alpha)x \quad (4)$$

Here, if the relational expressions $$\frac{dy}{dt} = \frac{yn - yn-1}{t}$$

and $$\frac{dx}{dt} = \frac{Xn - Xn-1}{t}$$

are substituted in Equation (4), $$yn + T_I \frac{yn - yn-1}{t} = Xn + \alpha T_I \frac{Xn - Xn-1}{t} \quad (5)$$

can be obtained. Moreover, if this equation is transformed, $$yn = yn-1 + \frac{\Delta t}{\Delta t + T_I}(Xn - yn-1) + \frac{\alpha T}{\Delta t + T_I}(Xn - Xn-1) \quad (6)$$

can be obtained.

When target variable SV is varied in step form at time n=1, Xn becomes Xn=Xn−1 at n>2. Thus, the response characteristic in FIG. 2 becomes $$yn = yn-1 + \frac{\Delta t}{\Delta t + T_I}(Xn - yn-1) \quad (7)$$

from Equation (6). Since $\Delta t$ in Equation (7) is very much smaller than $T_I$, and (Xn−yn−1) is also small, the values of the later stages in this equation become very much smaller. Moreover, the closer output yn−1 approaches input Xn, the smaller the variation of $\Delta yn$ becomes. As a result, it requires a relatively long time until output yn agrees with input Xn. Naturally, since this output yn is the target variable of PI control unit 24, the settling time becomes extremely long.

SUMMARY OF THE INVENTION

It is an object of this invention to improve the controllability of a target variable follow-up characteristic of a two degrees of freedom type control system.

Another object of the invention is to make it possible to control the target variable follow-up speed, A further object of the invention is to make it possible to control the target variable follow-up characteristic.

The foregoing objects are achieved according to the invention by providing a system for controlling a process system subject to an external disturbance by adjusting a process variable output by the process system to a given target variable.

The system comprises target variable filter means for generating a computed target variable to perform a compensation control operation according to a given revision coefficient to follow up a given target variable, deviation operation means for computing a deviation between the process variable and the computed target variable, main control means for performing at least proportional and integral control operations from a choice of proportional, integral, and derivative control operations on the computed deviation between the process variable and the computed target variable to suppress fluctuation of the process variable produced by the external disturbance, and target variable control means for changing an input into the deviation operation means from the computed target variable to the given target variable only when the deviation between the given target variable and the computed target variable computed by the target variable filter means is less than a predetermined value.

According to the another aspect of the invention, a mehod of controlling a process system subject to an external disturbance by adjusting according to a deviation output by a deviation operation means, a process variable output by the process system to a given target variable is provided. The method comprises the steps of: computing a deviation between the process variable and the computed target variable inputted into the deviation operation means; performing at least proportional and integral control operations on the computed deviation between the process variable and the computed target variable inputted from the deviation operation means to suppress fluctuation of the process variable produced by the external disturbance; and changing an input into the deviation operation means from the computed target variable to the given target variable only when a deviation between the given target variable and the computed target variable is less than a predetermined value.

DETAILED DESCRIPTION OF THE PREFERRED EMBODIMENTS

Figure 1:
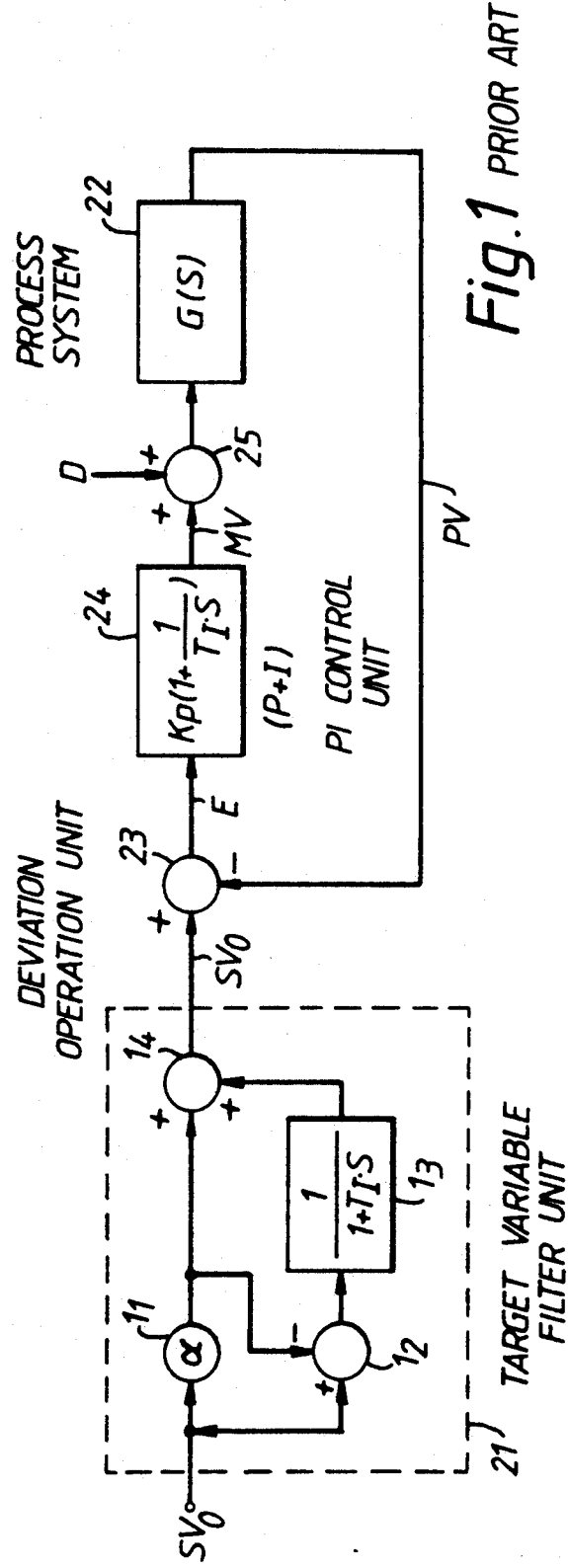
FIG. 1 is a block diagram showing a conventional two degrees of freedom type control system
Figure 3:
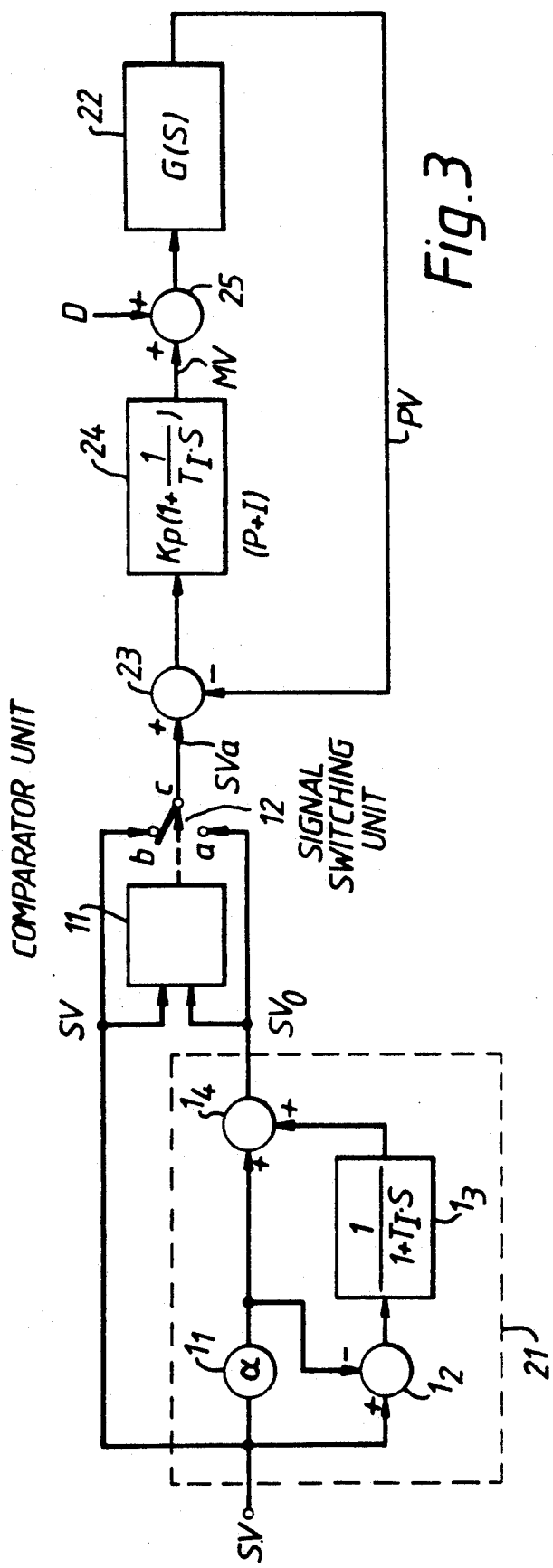
FIG. 3 is a block diagram showing an embodiment of the invention.

An embodiment of this invention is described below with reference to FIG. 3. In FIG. 3, the same symbols are used and detailed descriptions are omitted where components are the same as those in FIG. 1. The following is mainly a description of those components which differ from prior art.

That is to say, in the system of this invention, comparator unit 11 is provided between the control target variable input terminal and the output terminal of adder unit 14, for judging whether or not the deviation between control target variable SV and arithmetic target variable SVo, which is the output of target variable filter unit 21, is less than a pre-determined set value. Also, signal switching unit 12 is provided for introducing judgement values to deviation operation unit 23. When the above deviation is greater than the specified value in comparator unit 11, signal switching unit 12 receives a switching command and selects arithmetic target variable SVo. Also, when the deviation is smaller than the set value, it receives a switching command and selects control target variable SV.

Therefore, using the construction of this embodiment, when control target variable SV has changed to step form, comparator unit 11 compares the size relationship between a specified value and the deviation signal due to target variable SV and arithmetic target variable SVo. Since this is immediately after the change to step form, the relationship is $$|SV - SVo| > \delta$$

Figure 2:
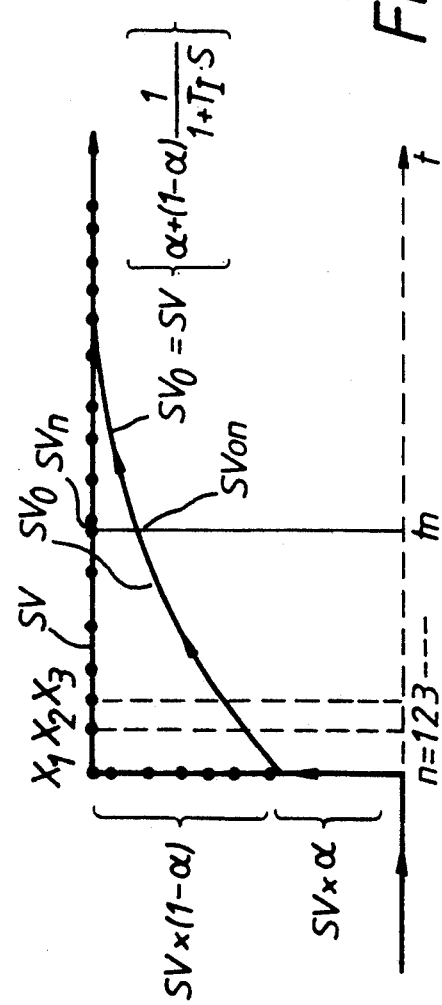
FIG. 2 is a diagram illustrating a step response of the target variable filter shown in FIG. 1.

As a result, signal switching unit 12 receives the output of comparator unit 11 and selects and outputs arithmetic target variable SVo. Therefore, in this case, target variable SVa for PI control unit 24 becomes SVo. This means that arithmetic target variable SVo with the same response characteristic as in FIG. 2 of the prior art is supplied to PI control unit 24. Incidentally, specified value $\delta$ is a value which has no effect on the 2 degrees of freedom, and it is determined on the basis of experiment and past experience.

After this, arithmetic target variable SVo gradually rises. At this time, comparator unit 11 compares the specified value $\delta$ with the deviation between target variable SV and arithmetic target variable SVo. When the relationship becomes $$|SV - SVo| < \delta$$

in other words, when the deviation is less than specified value $\delta$, a switching command is generated. Here, signal switching unit 12 receives this switching command and selects control target variable SV. Thus, the target variable PI control becomes SVa=SV, and target value SV can be settled in a short time, as shown at (a) in FIG. 4.

Incidentally, comparator unit 11 and signal switching unit 12 may be achieved by hardware using resistors, capacitors and semiconductors. They may also be achieved by software using a computer.

Next, an embodiment of this invention is described below with reference to FIG. 5. In this case also, the same symbols are used and detailed descriptions are omitted where components are the same as those in FIG. 1.

The following is mainly a description only of those components which are different. Apart from comparator unit 11 which has the same function as in FIG. 3, this embodiment is provided with subtractor unit 31, and adder unit 33.

Subtractor unit 31 subtracts arithmetic target variable SVo from target variable SV. Adder unit 33 adds the output obtained from subtractor unit 31 via signal switching unit 32 and arithmetic target variable SVo which is the output of target variable filter unit 21.

The construction is such that the output of adder unit 33 is introduced into deviation operation unit 23 as the target variable for PI control.

Therefore, as well as normally making arithmetic target variable SVo of target variable filter unit 21 the basis, this embodiment is provided with the function of judging whether or not to add the deviation between control target variable SV and arithmetic target variable SVo to arithmetic target variable SVo.

Therefore, using the construction of this embodiment, normally, arithmetic target variable SVo which is outputted from target variable filter unit 21 is introduced into deviation operation unit 23 as target variable SVa for PI control via adder unit 33.

In this state, when control target variable SV has changed to step form, comparator unit 11 compares a specified value $\delta$ and the deviation between target variable SV and arithmetic target variable SVo. Since this is immediately after the change to step form, the relationship is $$|SV-SVo| \geqq \delta$$

Since no switching command is generated from comparator unit 11, signal switching unit 32 is in a non-conductive state. As a result, Sva=Svo is transmitted to deviation operation unit 23 as the target variable for PI control.

Figure 4:
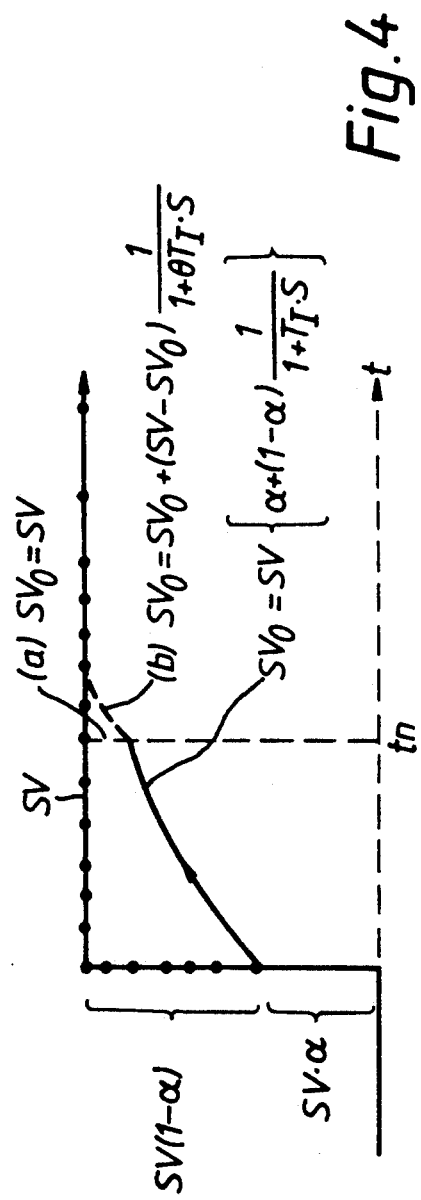
FIG. 4 is a diagram illustrating a step response of the target value filter shown in FIG. 3.

After this, arithmetic target variable SVo gradually rises. At this time, comparator unit 11 compares the specified value $\delta$ with the deviation between target variable SV and arithmetic target variable SVo. When the relationship becomes $$|SV-SVo|<\delta$$

in other words, when the deviation is less than specified value $\delta$, a switching command is generated. As a result, signal switching unit 32 becomes in a conductive state and introduces the subtraction signal (SV−SVo) from subtractor unit 31 to adder unit 33. Thus, the signal $$SVa=SVo+(SV-SVo)=SV$$

from adder unit 33, in other words target variable SV, is directly introduced into deviation operation unit 23. Therefore, the response characteristic for target variable change becomes as shown at (a) in FIG. 4 is the same way as in FIG. 3.

Thus, when using this embodiment, normally, arithmetic target variable SVo is introduced into deviation operation unit 23. The design is such that, when the deviation between target variable SV and arithmetic target variable SVo becomes less than specified value $\delta$, the subtraction signal (SV−SVo) is added to SVo. Thus, the target variable for PI control can be supplied to deviation operation unit 23 without any loss of time.

Figure 6:
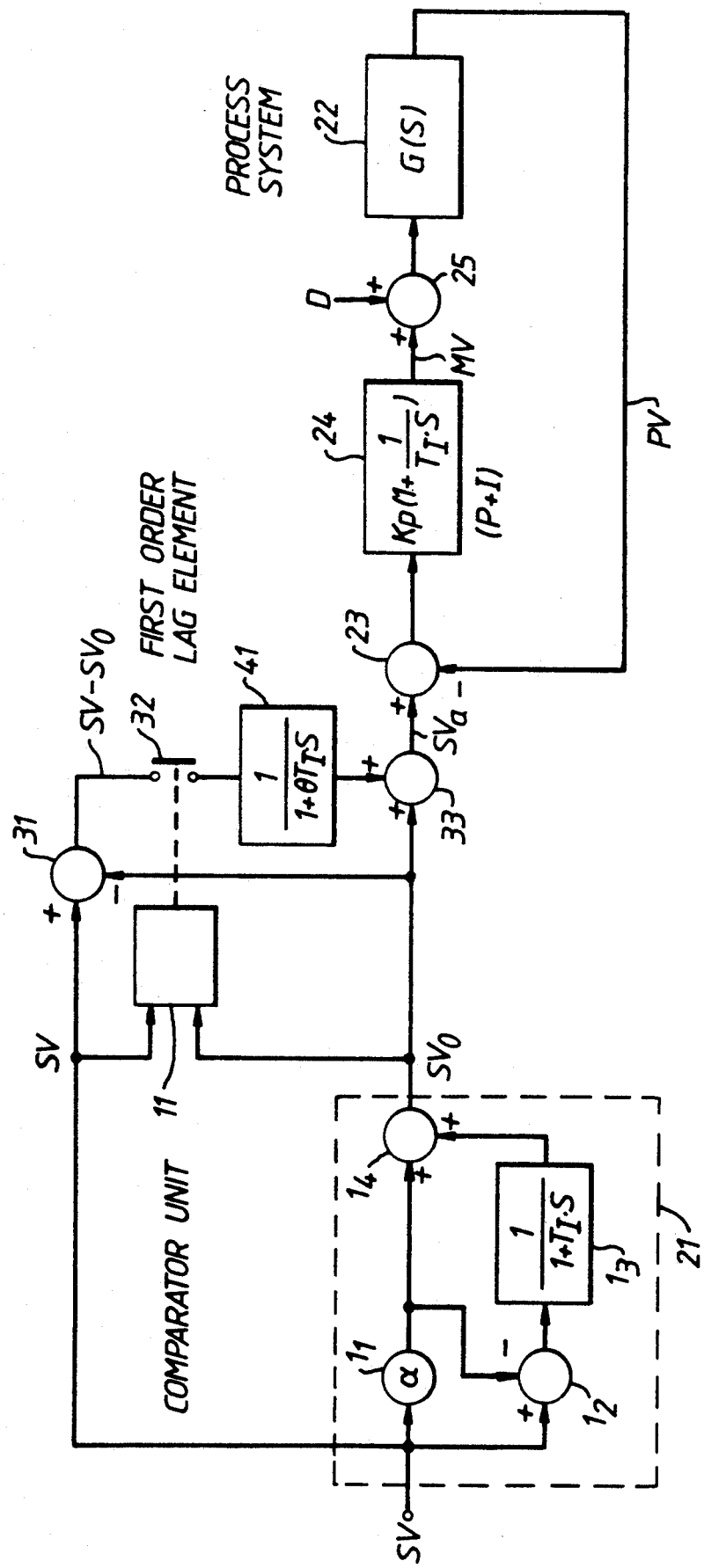

Next, an embodiment of this invention is described below with reference to FIG. 6. In this case also, the same symbols are used and detailed descriptions are omitted where components are the same as those in FIG. 1. The following is mainly a description only of those components which are different.

Figure 5:
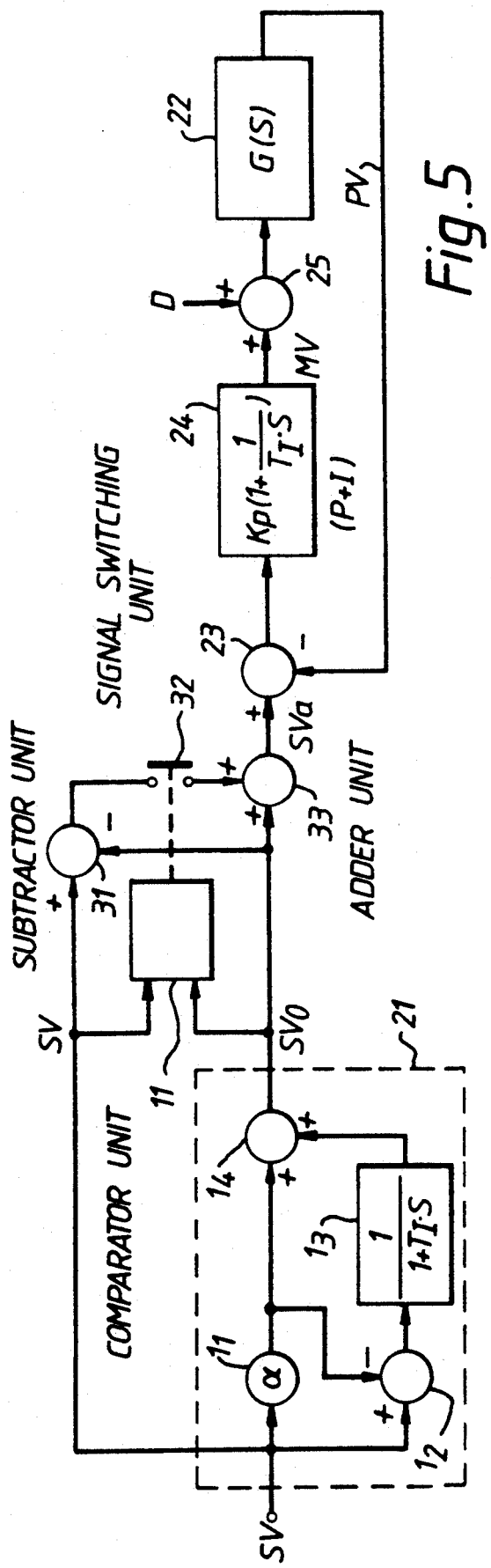
FIGS. 5, 6, 7 and 9 are block diagrams showing other embodiments of the invention.

This embodiment uses almost the same construction as in FIG. 5. The particular difference is that first order lag element 41 is added at the input side of adder unit 33.

Therefore, in this system, when target variable SV is changed to step form, in the same way as in FIG. 5, comparator unit 11 compares specified value $\delta$ with the deviation between target variable SV and arithmetic target variable SVo.

Since this is immediately after the change to steps, the relationship is $$|SV-SVo| \geqq \delta$$

For this reason, signal switching unit 32 is in a non-conductive state. As a result, SVa=SVo is transmitted to deviation operation unit 23 as the target variable for PI control.

However, when arithmetic target variable SVo has risen to a certain value, the relationship becomes $$|SV-SVo|<\delta$$

in other words, the deviation becomes less than specified value $\delta$, and a switching command is generated from comparator unit 11 at this time. As a result, signal switching unit 32 becomes in a conductive state and introduces the output (SV−SVo) of subtractor unit 31 to first order lag element 41. This output is smoothed by the delay operation $$SVa=SVo+(SV-SVo)\cdot\{1/(1+\theta T_f\cdot S)\}$$

and is added by adder unit 23. Thus, it settles to control target variable SV with the response curve shown at (b) in FIG. 2. Incidentally, $\theta$ is taken as less than 1.

Therefore, when using the construction of this embodiment, when signal switching unit 32 is conductive, subtraction output (SV−SVo) is added by adder unit 33 while smoothing. By this means, manipulating variable MV can be outputted from PI control unit 24 without any rapid change. Therefore, there is no shock to process system 22, nor is there any influence on the process.

Incidentally, this invention is not limited to the above embodiments. First order lag element 41 is provided on the input side of adder unit 33. However, the first order lag element may also be provided on the contact b side of signal switching unit 12 shown in FIG. 3. Also, PI control operation has been described in the above embodiments. However, this invention can also be applied in the same way in PID (D: derivative) control operation. In addition, this invention can be modified and applied in various ways within limits which do not deviate from its purpose.

When this invention is used as described above, the following can be achieved.

First, the response time for the change of target value can be greatly reduced within limits which do not interfere with the original function of imparting 2 degrees of freedom, and the target variable for control can be settled at the control target variable.

Next, for changes of the target variable when the deviation between the target variable for control and the control target variable becomes less than a specified value, the target variable for control can be transferred to the control target variable without any loss of time.

Moreover, when the deviation between the target variable control and the control target variable becomes less than a specified value, it can be transferred smoothly to the control target variable by smoothing the target variable for control.

Therefore, in the above invention, the target variable follow-up time for changes of target variable can be greatly reduced. Also, the performance of a control system fitted with a target variable filter unit can be greatly improved. Therefore, a higher performance of plant operating characteristics can be achieved by providing the above inventions throughout the plant.

Figure 7:
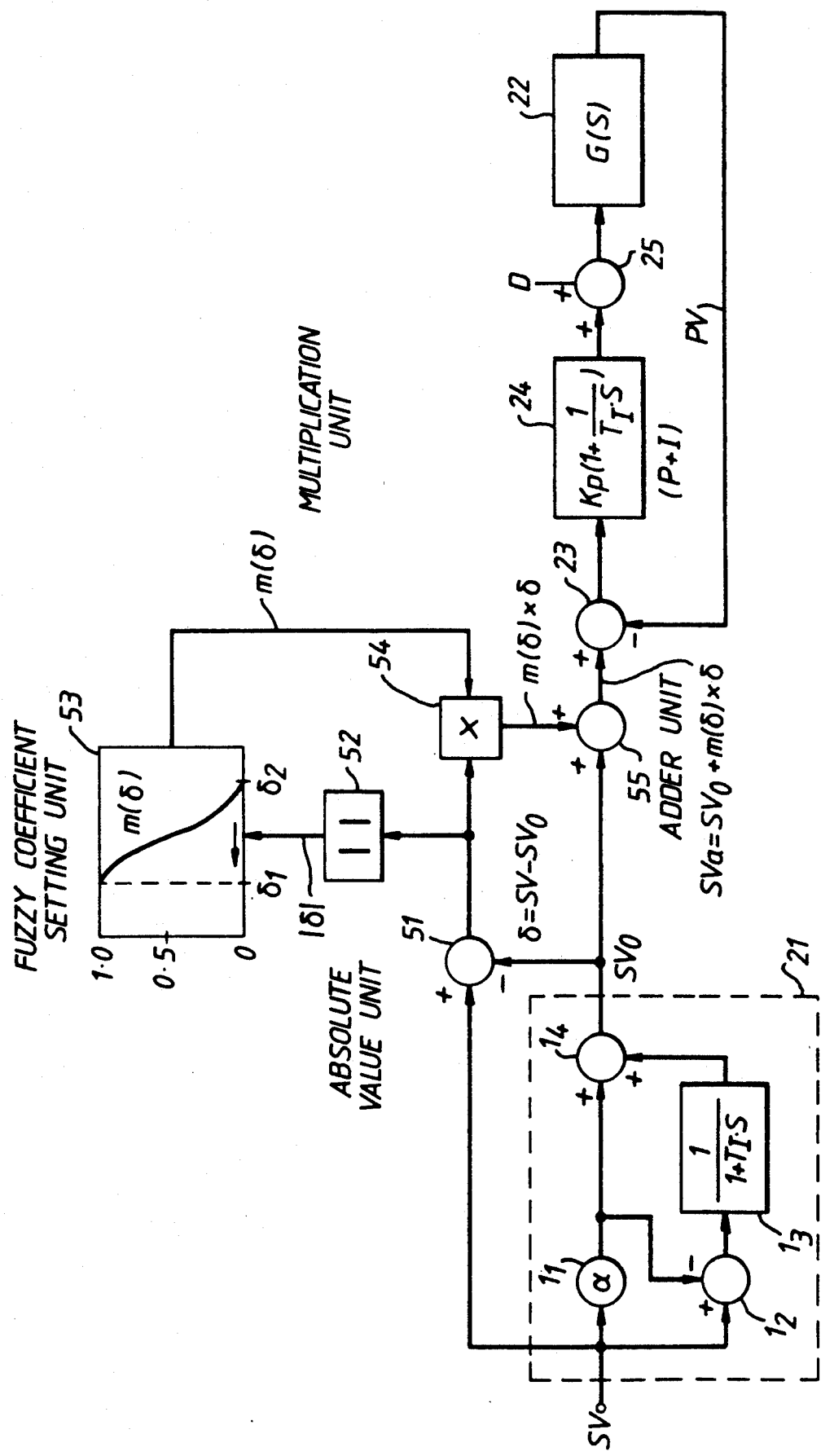

An embodiment of this invention is described below with reference to FIG. 7. In FIG. 7, the same symbols are used and detailed descriptions are omitted where components are the same as those in FIG. 1. The following is mainly a description of those components which differ from prior art.

That is to say, this system is provided with subtractor unit 51 between the control target variable input terminal and the output terminal of adder unit 14. At the same time, absolute value unit 52 is provided at the output side of subtractor unit 51. The design is that absolute value $|\delta|$ of deviation $\delta$ between control target variable SV and arithmetic target variable SVo is fetched. Also, membership function m($\delta$) which takes a value from 0 to 1 in response to the absolute value is determined beforehand. Fuzzy coefficient setting unit 53 is provided which outputs membership function m($\delta$) in response to the absolute value $|\delta|$ obtained from absolute value unit 52. Furthermore, apart from multiplication unit 54 which multiplies output of subtractor unit 51 by membership function m($\delta$), adder unit 55 which makes the target variable SVa for PI control by adding the multiplication value obtained by multiplication unit 54 and arithmetic target variable SVo is also provided.

Therefore, when using the construction of the above embodiment, the deviation $\delta=SV-SVo$ between control target variable SV and arithmetic target variable SVo is obtained by subtractor unit 51 for the variation of the step form of control target variable SV. Then, this deviation $\delta$ is transmitted to absolute value unit 52 and multiplication unit 54. After the absolute Value $|\delta|$ of deviation $\delta$ has been obtained by absolute value unit 52, it is introduced to fuzzy coefficient setting unit 53.

Figure 8:
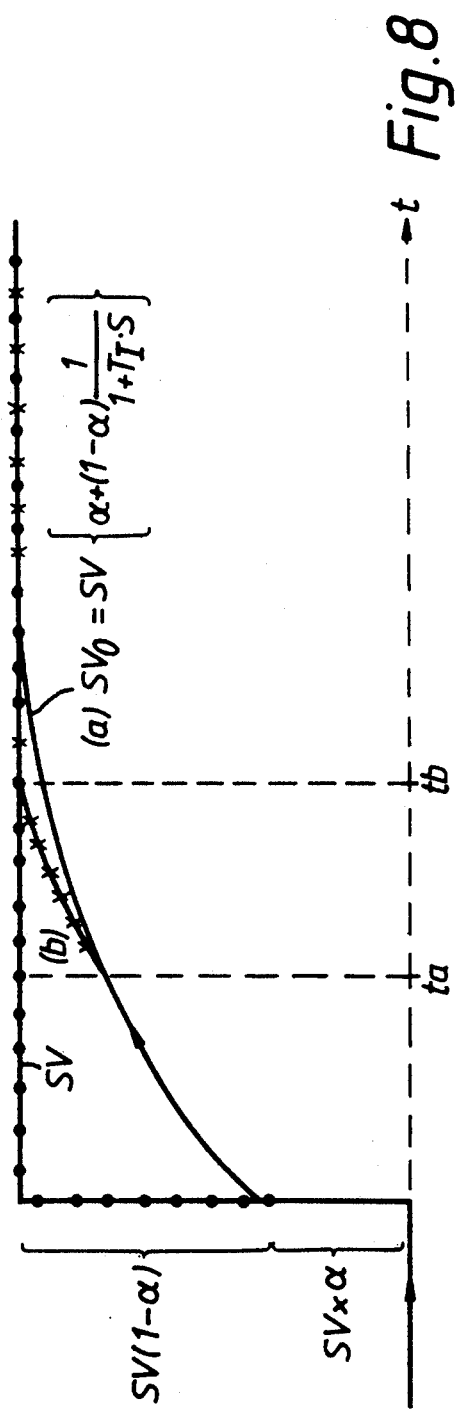
FIG. 8 is a diagram illustrating the target variable follow-up characteristic of the embodiment of the invention shown in FIG. 7.

In fuzzy coefficient setting unit 53, when deviation $\delta=(SV-SVo)$ has become smaller than a value, for instance $\delta2$, which does not interfere with the function of the originally imparted 2 degrees of freedom, membership function m($\delta$) which exponentially takes the value 0→1 in the interval up to $\delta1$ is outputted and transmitted to multiplication unit 54 as this value $\delta2$ of the deviation becomes smaller. As a result, multiplication unit 54 outputs multiplication variable m($\delta$)·$\delta$ which becomes greater at a faster speed than the speed at which deviation signal $\delta(=SV-SVo)$, which is transmitted from subtractor unit 51, gradually becomes smaller. For this reason, from adder unit 55 onwards, the response curve becomes steeper from a given time, that is to say from time ta, which is specified deviation $\delta2$, and settles faster to control target variable SV, as shown at (b) in FIG. 8.

The fuzzy coefficient setting unit 53, etc, may be achieved by hardware using resistors, capacitors and semiconductors. They may also be achieved by means of software using a computer.

Figure 9:
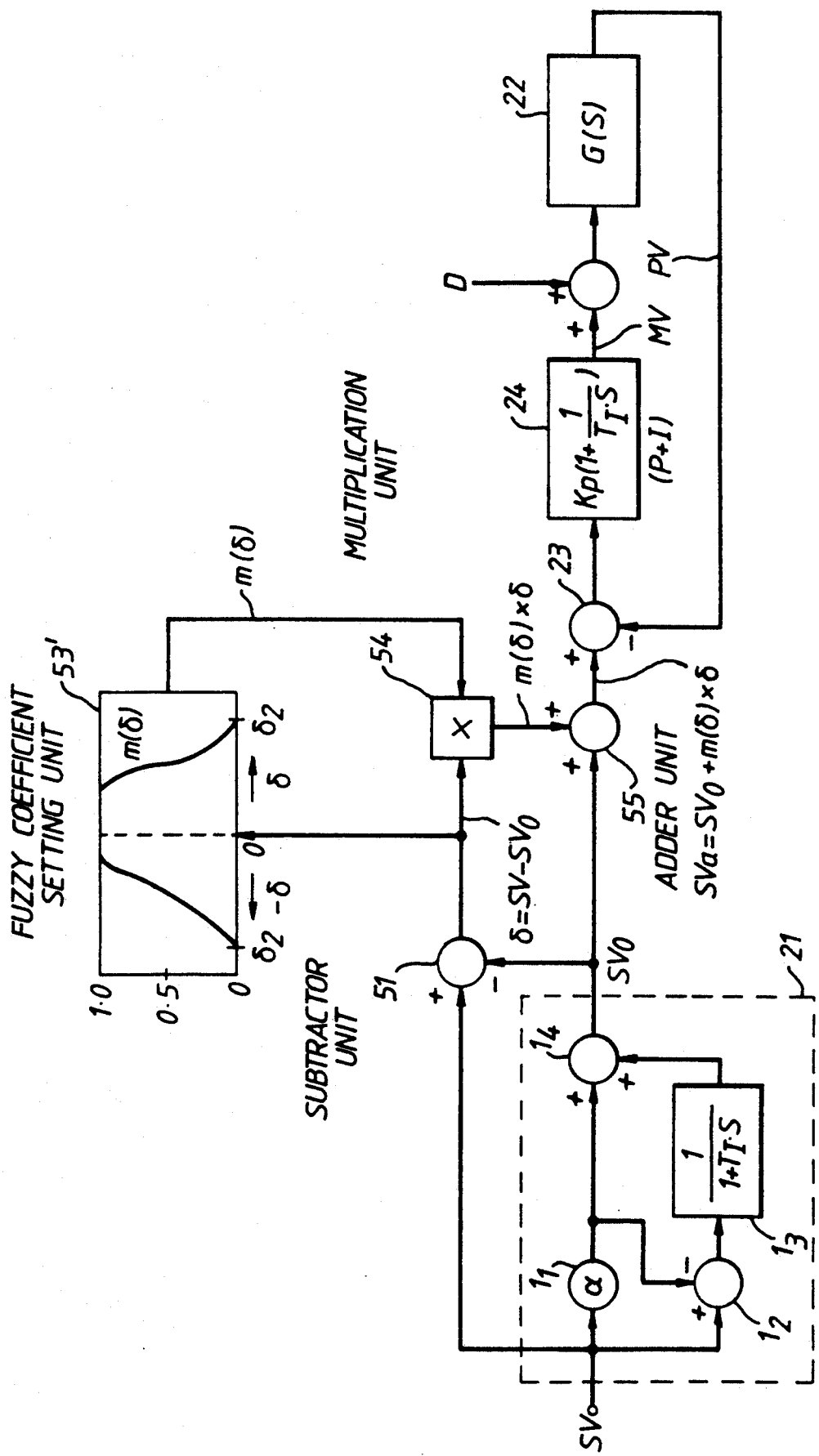

Next, the following is a description of another embodiment of this invention with reference to FIG. 9. In this case also, the same symbols are used and descriptions are omitted for parts which are the same as in FIG. 1. The following is mainly a description only of those parts which differ.

That is to say, this embodiment is a design in which absolute value unit 52 is omitted from FIG. 7. Because of this, fuzzy coefficient setting unit 53' individually sets membership functions m($\delta$) in response to the sign of the deviation between control target variable SV and arithmetic target variable SVo. The membership functions m($\delta$) for plus and minus are set so that they differ.

The following is a description of a system constructed in this way. Target variable SVa for PI control in this system is expressed as $$SVa=SVo+m(\delta)\cdot(SV-SVo) \quad (8)$$

Here, when control target variable SV changes to step form, since the deviation $\delta$ of (SV−SVo) is greater and the relationship is $$\delta2 \leq \delta \quad (9)$$

the membership function becomes m($\delta$)=0. Thus, from equation (8), SVa=SVo. That is to say, $$SVa = SV\left( \alpha + (1 - \alpha) \cdot \frac{1}{1 + T_I \cdot S} \right) \quad (10)$$

Thus, SVa is determined only by the transfer function of target variable filter unit 21, and is then introduced into deviation operation unit 13 as the target variable for PI control. Therefore, in this case, exactly the same response curve as in prior art can be obtained.

After this, when deviation $\delta$ obtained from subtractor unit 51 becomes smaller than $\delta2$, and the relationship becomes $$\delta1 \leq \delta < \delta2 \quad (11)$$

the membership function from fuzzy coefficient setting unit 53' becomes 0<m($\delta$)<1. Thus, from equation (8), $$SVa=SVo+m(\delta)\times(SV-SVo) \quad (12)$$

and this SVa is transmitted to deviation operation unit 23 as the target variable for PI control. Therefore, in this case, at the time when deviation $\delta$ becomes smsller than deviation $\delta2$, the response curve becomes steeper than the prior art response curve, as shown at (b) in FIG. 8, and it approaches control target variable SV.

Moreover, when deviation $\delta$ obtained from subtractor unit 51 has become smaller and the relationship has become $$0 \leq \delta < \delta1 \quad (13)$$

the membership function beomes m($\delta$)=1. Thus, from equation (8), $$SVa=SV \quad (14)$$

and control target value SV is transmitted to deviation operation unit 23 as it stands as the target variable for PI control. As a result, since the target variable for PI control is forcibly taken as control target variable SV at time tb when the deviation has becomes δ1, it can be settled in a very much shorter time than in prior art.

Thus, when using the construction of the above embodiment, the design is that target variable SVa for PI control is forcibly and rapidly transferred to control target variable SV from the arithmetic target variable SVo of target variable filter unit 21 using the membership function, when arithmetic target variable SVo of target variable filter unit 21 approaches control target variable SV, that is to say when the deviation between the two target variables becomes less than specified value δ2. Therefore, the target variable follow-up time can be greatly reduced without any influence on the function of 2 degrees of freedom. Thus, the performance of this type of control device with 2 degrees of freedom can be greatly improved. Therefore, the provision of these systems throughout a plant can greatly contribute to improvement of the plant operating characteristics.

Incidentally, the above embodiments are designed to supply the multiplication variable of the output of subtactor unit 51 and the membership function to adder unit 55. However, they may also be designed to eliminate multiplication unit 54 and to output values equivalent to the multiplication variable from fuzzy coefficient setting units 53 and 53' and then add them in adder unit 55. Also, PI control operation has been described in the above embodiments. However, needless to say, this invention can also applied in the same way for PID control operation. In addition, this invention can be modified and applied in various ways within limits which do not deviate from its purport.

When using this invention as described above, a fuzzy combination type control system with 2 degrees of freedom can be provided which can greatly reduce the response time for variation of the target variable compared with the prior art, and thus contributes greatly to the improvement of performance.

What is claimed is:

1. A system for controlling a process system subject to an external disturbance by adjusting a process variable output by the process system to a given target variable comprising:
    target variable filter means for generating a computed target variable, to perform a compensation control operation;
    deviation operation means for computing a deviation between the process variable and the computed target variable inputted from the target variable filter means;
    main control means for performing at least proportional and integral control operations on the computed deviation between the process variable and the computed target variable inputted from the deviation operation means to suppress fluctuation of the process variable produced by the external disturbance; and
    target variable control means for changing an input into the deviation operation means from the computer target variable to the given target variable only when the deviation between the given target variable and the computed target variable computed by the target variable filter means is less than a predetermined value.

2. The system of claim 1, wherein the target variable control means includes comparator means for generating a switching signal when the deviation between the given target variable and the computed target variable is less than a predetermined value, and switching means responsive to the switching signal for changing an input into the deviation operation means from the computed target variable to the given target variable.

3. The system of the claim 1, wherein the target variable control means includes comparator means for generating a switching signal when the deviation between the given target variable and the computed target variable is less than a predetermined value, subtractor means for holding the deviation, and switching means responsive to the switching signal for adding the deviation to the computed target variable.

4. The system of the claim 3, wherein the switching means includes adder means for adding the deviation to the computed target value to supply the given target variable to the deviation operation means, and signal switching means responsive to the switching signal for inputting the deviation to the adder means.

5. The system of the claim 5, wherein the switching means further includes first order lag element means for smoothing the deviation before the deviation is input into the adder means.

6. A system for controlling a process system subject to an external disturbance by adjusting a process variable output by the process system to a given target variable, comprising:
    target variable filter means for generating a computed target variable to perform a compensation control operation;
    deviation operation means for computing a deviation between the process variable and the computed target variable inputted from the target variable filter means;
    main control means for performing at least proportional and integral control operations on the computed deviation between the process variable and the computed target variable inputted from the deviation operation means to suppress fluctuation of the process variable produced by the external disturbance; and
    target variable control means for changing an input into the deviation operation means from the computed target variable to the given target variable, at a predetermined speed rate, when the deviation between the given target variable and the computed target variable has become less than a predetermined value.

7. The system of the claim 6, wherein the target variable control means includes subtractor means for holding a deviation between the given target variable and the computed target variable, fuzzy coefficient generating means for generating a fuzzy coefficient having a value between 1 and 0 according to the deviation, for generating a multiplication variable produced by multiplying the deviation by the fuzzy coefficient value, and, for supplying the computed target variable and the multiplication variable to the deviation operation means.

8. The system of the claim 7, wherein the fuzzy coefficient generating means includes absolute value means for converting the value of the deviation to its absolute value, fuzzy coefficient setting means for generating a fuzzy coefficient value having a value between 1 and 0 according to the absolute value of the deviation, adder means for supplying the computed target variable and the multiplication variable to the deviation operation means, and multiplication means for generating a multiplication variable produced by multiplying the deviation by the fuzzy coefficient value.

9. A method of controlling a process system subject to an external disturbance by adjusting according to a deviation output by a deviation operation means, a process variable output by the process system to a given target variable, comprising the steps of:
generating a computed target variable to perform a compensation control operation;
computing a deviation between the process variable and the computed target variable inputted into the deviation operation means;
performing at least proportional and integral control operations on the computed deviation between the process variable and the computed target variable inputted from the deviation operation means to suppress fluctuation of the process variable produced by the external disturbance; and
changing an input into the deviation operation means from the computed target variable to the given target variable only when a deviation between the given target variable and the computed target variable is less than a predetermined value.

10. The method of claim 9, wherein the step of changing includes the step of generating a switching signal when the deviation between the given target variable and the computed target variable is less than a predetermined value, and the step of changing in response to the switching signal an input into the deviation operation means from the computed target variable to the given target variable.

11. The method of the claim 9, wherein the step of changing includes the step of generating a switching signal when the deviation between the given target variable and the computed target variable is less than a predetermined value, the step of holding the deviation, and the step of adding the deviation to the computed target variable to supply the given target variable to the deviation operation means.

12. The method of the claim 11, wherein the step of adding further includes the step of smoothing the deviation.

13. A method of controlling a process system subject to an external disturbance by adjusting, according to a deviation output by a deviation operation means, a process variable output by the process system to a given target variable, comprising the steps of:
generating a computed target variable to perform a compensation control operation;
computing a deviation between the process variable and the computed target variable inputted into the deviation operation means;
performing at least proportional and integral control operations on the computed deviation between the process variable and the computed target variable inputted from the deviation operation means to suppress fluctuation of the process variable produced by the external disturbance; and
changing an input into the deviation operation means from the computed target variable to the given target variable, at a predetermined speed rate, when a deviation between the given target variable and the computed target variable has become less than a predetermined value.

14. The method of the claim 13, wherein the step of changing includes the step of holding the deviation, the step of generating a fuzzy coefficient having a value between 1 and 0 according to the deviation, the step of generating a multiplication variable produced by multiplying the deviation by the fuzzy coefficient value, and the step of supplying the computed target variable and the multiplication variable to the deviation operation means.

15. The method of the claim 14, wherein the step of generating a fuzzy coefficient includes the step of converting the value of the deviation to its absolute value, the step of generating a fuzzy coefficient value having a value between 1 and 0 according to the absolute value of the deviation, the step of supplying the computed target variable and the multiplication variable to the deviation operation means, and the step of generating a multiplication variable produced by multiplying the deviation by the fuzzy coefficient value.

* * * * *